June 3, 1930.  F. H. ARNOLD  1,761,974
GLARE SHIELD FOR AUTOMOBILE HEADLIGHT BULBS
Filed Nov. 19, 1928
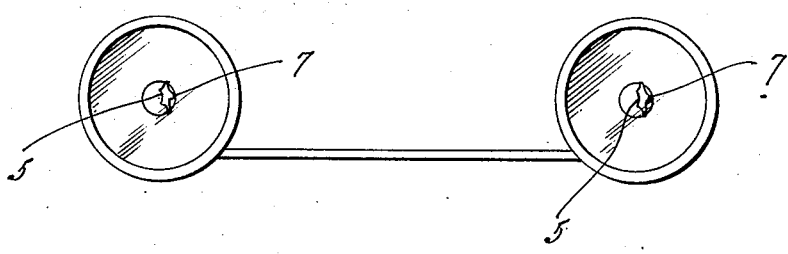
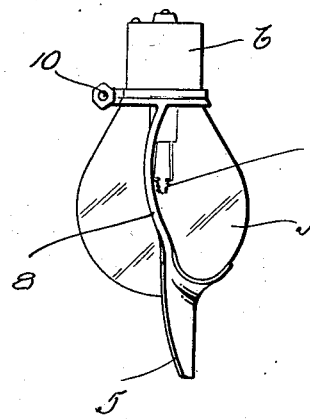
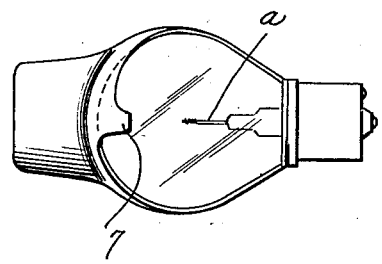
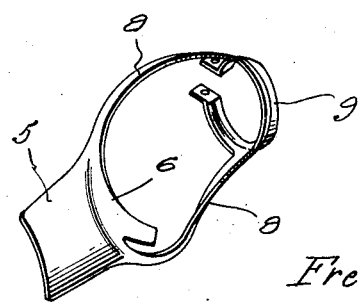
Inventor
Frederick H. Arnold
By Clarence A. O'Brien
Attorney Patented June 3, 1930

1,761,974

UNITED STATES PATENT OFFICE

FREDERICK H. ARNOLD, OF READING, PENNSYLVANIA

GLARE SHIELD FOR AUTOMOBILE HEADLIGHT BULBS

Application filed November 19, 1928. Serial No. 320,414.

This invention relates to new and useful improvements in glare shields for application direct to the bulbs of automobile headlights and aims to provide a simple and inexpensive shield that is adapted to be arranged in such position upon the bulbs as to prevent the direct rays of light from the bulb filament meeting the eyes of the drivers of oncoming automobiles, the object of this shape and position being that it confines the upper beams to a horizontal line no higher than the lamps, and deflects the volume of beam rays to the beam centers, and does not dim the required candle power, the said shield comprising a tongue of metal having means whereby the attachment of the device to the bulb will arrange said tongue at the forward end of the bulb and slightly to the left of the center line of the lamp filament. Furthermore, at the inner end of this tongue there is provided a small secondary tongue for engagement over a portion of the side of the bulb to the left at its front end and in line with the lamp filament so that the direct rays of light from the filament will not reach the eyes of the drivers of oncoming machines as they are about to meet the machine wherein the headlight bulbs are equipped with my improved glare shields.

Furthermore, the provision of a shield of this character will at all times direct the light rays toward the center line of the automobile and toward the right side of the machine so as to illuminate concrete shoulders, ditches, or the like at the right side of the road protecting the drivers of the machine from running off the road into the shoulders and ditches.

A most important object of this invention is to provide a device of this character that is simple in construction and inexpensive to manufacture and that may be quickly applied to headlight bulbs by the owner of the machine, and this without great difficulty.

With the foregoing and other objects in view as the nature of the invention will be better understood, the same comprises the novel form, combination and arrangement of parts hereinafter more fully described, shown in the accompanying drawings and claimed.

In the drawings wherein like numerals of reference indicate corresponding parts throughout the several views:

Figure is a diagrammatic front elevation of a pair of automobile headlights, the bulbs thereof being equipped with my improved shield.

Figure 2 is a top plan view of a conventional headlight bulb equipped with a shield constructed in accordance with the present invention.

Figure 3 is a detail left side elevation of the bulb so equipped, and

Figure 4 is a left side perspective of the shield per se.

Now having particular reference to the drawings, my improved device is preferably constructed of a single piece of material stamped from a sheet of polished metal of any suitable nature, and which device consists of a tongue 5 of predetermined length and width and preferably slightly curved throughout its transverse axis.

The inner end of this tongue is curved to conform to the curvature of the forward end of a headlight bulb A at a point slightly to the left of the forward end of the said bulb. Furthermore, formed at the inner edge of this tongue 5 is a skirt 6 adapted to engage over a small area of the bulb A to the left of the inner end of said tongue 5. This skirt 6 is formed at approximately the center line of the tongue 5 with a rearwardly extending short tongue 7 adapted to be arranged upon the side of the bulb in direct longitudinal alinement with the filament $a$ of said bulb. Furthermore, by considering Figures 3 and 4, it will be noted that the width of said skirt 6 above this tongue 7 is somewhat greater than the width of the skirt beneath this tongue. This is for the purpose of providing means for shading direct light rays emanating from and projecting longitudinally forwardly from the filament $a$ above the center line of the bulb so that the rays will not be directed into the eyes of drivers of the on-coming vehicles as they are about to meet the machine the headlight bulbs of which are equipped with my improved shield.

Furthermore, the small tongues 7 prevent the passage of the light rays from the filament through the end of the bulb at the center line thereof directly in back of said tongue 5. Any of the direct rays escaping from the bulb beneath the tongue 7 create no danger for the reason that said rays are below the line of vision of the drivers of oncoming machines.

Extending rearwardly from the opposite longitudinal edges of the tongue 5 and merging into this tongue and into the skirt portion 6 thereof are thin metal strips 8—8 shaped to conform to the curvature of the bulb A and adapted to snugly fit said bulb as clearly illustrated in Figures 2 and 3. The rear ends of these strips 8—8 merge into a right angular clamping ring 9 adapted to be engaged around the plug end $b$ of the bulb A and to be tightly secured in place by a bolt and nut connection 10 passing through openings in outwardly bent ears at the ends of the ring as clearly disclosed in Figure 4.

In view of the foregoing description when considered in conjunction with the accompanying drawing it will be apparent that I have provided a novel, simple and efficient shield for headlight bulbs that will produce all the results hereinbefore set out, even though I have herein shown and described this device as consisting of certain integrally united elements, it is nevertheless to be understood that the size and shape of these elements may be changed, or they may be separate from each other and united in any desired manner, or other changes may be made without affecting the spirit and scope of the appended claims.

Having thus described the invention, what I claim as new and desire to secure by Letters Patent is:—

1. A glare shield for lamp bulbs, said shield comprising a vertical tongue merging at its inner vertical edge into a skirt portion disposed at an angle thereto, said skirt portion at approximately the center line of said tongue merging into a relatively short secondary tongue, and said skirt at opposite ends thereof being provided with rearwardly extending thin metal strips of a shape conforming to the curvature of the lamp bulb and adapted to engage the bulb at opposite sides thereof, said first mentioned tongue adapted to be positioned forwardly of the bulb and to one side thereof.

2. A glare shield for lamp bulbs, said shield comprising a vertical tongue merging at its inner vertical edge into a skirt portion disposed at an angle thereto, said skirt portion at approximately the center line of said tongue merging into a relatively short secondary tongue, and said skirt at opposite ends thereof being provided with rearwardly extending thin metal strips of a shape conforming to the curvature of the lamp bulb and adapted to engage the bulb at opposite sides thereof, said first mentioned tongue adapted to be positioned forwardly of the bulb and to one side thereof, and said first mentioned tongue being curved transversely, and said secondary tongue adapted to be positioned on one side of the bulb and in direct longitudinal alignment with the filament of the bulb.

3. A glare shield of the class described comprising a vertically disposed tongue curved transversely, and at its opposite end merging into a pair of co-extensive elongated strips adapted to embrace an electric bulb, whereby said tongue may be supported forwardly of and to one side of the bulb, said strips being joined at their rear ends by an integral split ring for connecting the strips together to maintain said shield on the bulb with said strips arranged on the bulb conformably with the diameter of the bulb, and said tongue at its rear vertical edge being bent at right angles to provide an apron, said apron in turn merging into a relatively small secondary tongue adapted to align with the filament of the bulb, the portion of the apron above said secondary tongue being of greater width than that portion of the apron below said secondary tongue.

In testimony whereof I affix my signature.

FREDERICK H. ARNOLD.